United States Patent [19]

Roberts et al.

[11] Patent Number: 5,703,745
[45] Date of Patent: Dec. 30, 1997

[54] SYSTEM FOR DETECTION OF TRANSIENTS FROM A COUPLING CAPACITOR VOLTAGE TRANSFORMER USED IN A PROTECTIVE RELAY

[75] Inventors: Jeffrey B. Roberts, Moscow, Id.; Daqing Hou, Pullman, Wash.

[73] Assignee: Schweitzer Engineering Laboratories, Inc., Pullman, Wash.

[21] Appl. No.: 546,226

[22] Filed: Oct. 20, 1995

[51] Int. Cl.$^6$ .................................................. H02H 3/38
[52] U.S. Cl. ................................................ 361/89; 361/80
[58] Field of Search .......................... 361/65, 80, 89, 361/94

[56] References Cited

U.S. PATENT DOCUMENTS 4,821,137  4/1989  Wilkinson ........................ 361/80
5,349,490  9/1994  Roberts et al. .................. 361/80

OTHER PUBLICATIONS

Electric Machinery, A.E. Fitzerald et al., 4th edition, 1983, McGraw-Hill Book Company, USA, pp. 499–500, 528–530, 1983.

Primary Examiner—Jeffrey A. Gaffin
Assistant Examiner—Thuy-Trang N. Huynh
Attorney, Agent, or Firm—Jensen & Puntigam, P.S.

[57] ABSTRACT

The voltage and current conditions on a power transmission line are monitored to determine the coincidence of a low voltage condition and a lack of a high current condition. The coincidence of those two conditions is indicative of a CCVT transient, and the tripping action from zone 1 distance elements is delayed for a period of 1.375 cycles. The tripping delay is supervised by a fault impedance determination, which, if a threshold is exceeded, the remaining portion of the time delay is eliminated, so that a trip is allowed if the time delay period has not expired.

12 Claims, 3 Drawing Sheets

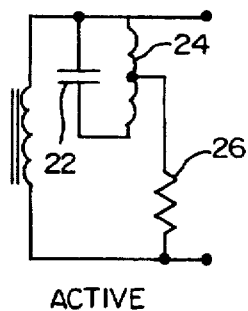
FIG. 4A
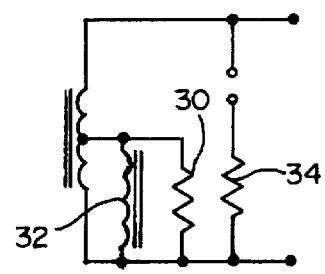
FIG. 4B
FIG. 5
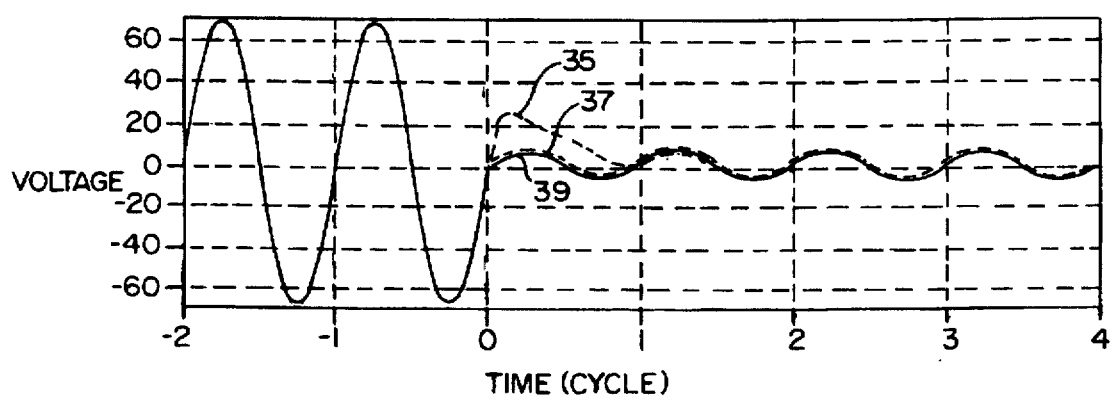

SYSTEM FOR DETECTION OF TRANSIENTS FROM A COUPLING CAPACITOR VOLTAGE TRANSFORMER USED IN A PROTECTIVE RELAY

TECHNICAL FIELD

This invention concerns generally the use of capacitively coupled voltage transformers with protective relay systems for power transmission lines, and more specifically concerns logic circuitry for detecting a transient output from such capacitive voltage transformers.

BACKGROUND OF THE INVENTION

The use of coupling capacitor voltage transformers (CCVT) with protective relays is well known in transmission line protection. They are used as part of the voltage step-down system to decrease the voltage from the level on the transmission line (approximately 132.8 kv) phase-phase to a 66.4 volt level which is used by the protective relay in its monitoring of voltage conditions on the line. Briefly, the capacitor portion of the CCVT accomplishes an initial step-down voltage function, typically to a range of 5 kv to 15 kv, while the transformer portion of the CCVT accomplishes the additional step-down function to 115 volts phase-phase or 66.4 volts phase-ground.

In the past, CCVTs have provided satisfactory results when used with conventional electromechanical relays. However, with the introduction and now relatively widespread use of high-speed, solid-state and numerical-based relays, the primary disadvantage of many CCVTs, i.e. a relatively poor transient response, is significantly accentuated. The poor transient response of a CCVT, in which the output of the CCVT (the secondary of the transformer portion thereof) does not follow the input voltage, is due to the energy storage elements (the capacitors and the inductor) in the CCVT, which require time to dissipate their stored energy.

When a fault occurs, the input voltage to the CCVT from the transmission line can drop dramatically to a relatively low voltage. The output of the CCVT, however, instead of replicating the ratioed input voltage (the ideal CCVT secondary output) accurately, produces a transient response (an output which does not exactly match the ideal secondary output). After a certain amount of time, the CCVT output again is coincident with the ratioed input voltage.

A high-speed protective relay, such as currently available solid-state relays, can actually respond to such transients. If the fault on the transmission line is outside of the defined zone 1 reach of the relay (the typical protective relay will have several zones of protection), the particular distance elements in the relay responsible for zone 1 protection can overreach in response to the transient and produce an undesirable output. One response to the overreach problem is to reduce the zone 1 reach, although the CCVT transient in some situations is sufficiently large or of sufficient duration that the reduction of zone 1 results in zone 1 protection being no longer effective. Because zone 1 elements are primary protection for the transmission line, it is very desirable to have as much of the transmission line protected by zone 1 elements as possible. Accordingly, it is undesirable to significantly reduce the zone 1 reach and thereby reduce that portion of the line protected by zone 1 elements.

The CCVT transient reduces the fundamental component of fault voltage, which in turn results in a reduction of the calculated fault impedance. Further, if the output of a CCVT is significantly distorted due to the presence of a transient, the distance relay is incapable of measuring the correct faulted line impedance during the time of transient distortion. The result of the CCVT transient is the overreaching by the distance elements, with the zone 1 element overreach having the most undesirable result, as these elements are usually instantaneous.

Hence, while a CCVT has certain advantages (low cost at high voltage installations) which make it useful with protective relays, its usefulness is diminished by the fast response of the new solid-state and microprocessor protective relays, to the point where any results achieved during the transient time are unreliable.

DISCLOSURE OF THE INVENTION

Accordingly, the present invention is a system for detecting a transient signal from a coupling capacitor voltage transformer used with a protective relay for a power system, comprising: means for detecting a low voltage condition on the power transmission line which would otherwise result in a trip signal to a circuit breaker for the system; means for detecting a high current condition on the power transmission line; means for time delaying the trip signal if a high current condition is not present when the low voltage condition is detected; and means for by-passing a remaining portion of the time delay, such that a trip signal is sent to the circuit breaker prior to expiration of the time delay if a fault impedance determination achieves a selected characteristic prior to completion of the time delay.

BRIEF DESCRIPTION OF THE DRAWINGS

FIG. 4a is a diagram showing one ferroresonance circuit portion of a CCVT.

FIG. 4b shows an alternative to the circuit of FIG. 4a.

FIG. 5 is a diagram showing the transients of two CCVTs having different ferroresonance suppression circuits.

BEST MODE FOR CARRYING OUT THE INVENTION

Figure 1:
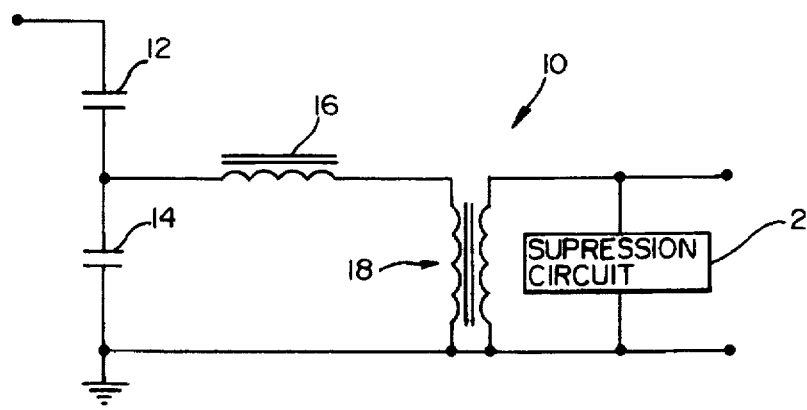
FIG. 1 is a diagram of a typical coupling capacitor voltage transformer.

FIG. 1 shows a typical coupling capacitor voltage transformer (CCVT) which is useful in stepping down transmission line voltage for use by substation protection, control and monitoring equipment, such as a protective relay. The CCVT steps down the voltage level of the signal on the power transmission line to a level useful by such devices. The CCVT of FIG. 1, referred to generally at 10, includes coupling capacitors 12 and 14. The individual coupling capacitors 12 and 14 may each comprise a number of individual capacitors, but in any case, form a voltage divider between the transmission line voltage and ground.

The voltage divider formed by capacitors 12 and 14 typically provide an initial step-down function to a voltage in the 5–15 kv range. A compensating reactor element, i.e. inductor 16, which typically has an iron core, is connected from a point between capacitors 12 and 14 and the primary of a conventional step-down transformer 18, which also typically includes an iron core. Compensating reactor 16 in effect cancels the reactance of the coupling capacitors 12 and 14 at the fundamental frequency of the power system, and prevents a phase shift between the primary and secondary voltages at that frequency. Typically, the voltage at the secondary of the step-down transformer 18 is at a level which is appropriate for the follow-on protective relay, i.e. 115 volts phase-phase, or 66.4 volts phase-ground.

Compensating reactor 16 and step-down transformer 18, however, introduce a number of specific losses, including copper and core losses. The combination of capacitors and inductors also introduces the possibility of a ferroresonance effect. To compensate for the possible ferroresonance effect, a ferroresonance suppression circuit 20 is connected across the secondary of the transformer 18. The ferroresonance suppression circuit 20, which is discussed in more detail below, is necessary to avoid over-voltages caused by ferroresonance, but has the possible negative effect on CCVT performance of aggravating the transient response, depending upon the particular suppression circuit used.

As briefly discussed above, while the CCVT has its advantages, it also produces a transient following changes, particularly significant changes, to the input voltage, the transient being produced when a fault occurs on the transmission line and the power line voltages quickly change from a nominal level to a relatively low level. Instead of following precisely the change in line voltage, the output of the CCVT includes a temporary transient, somewhat like a DC offset, which remains for a certain amount of time following the change in input line voltage. The transient occurs because coupling capacitors 12 and 14 and the compensating reactor 16 are energy storage elements which cannot instantaneously change their charge or flux.

Figure 2:
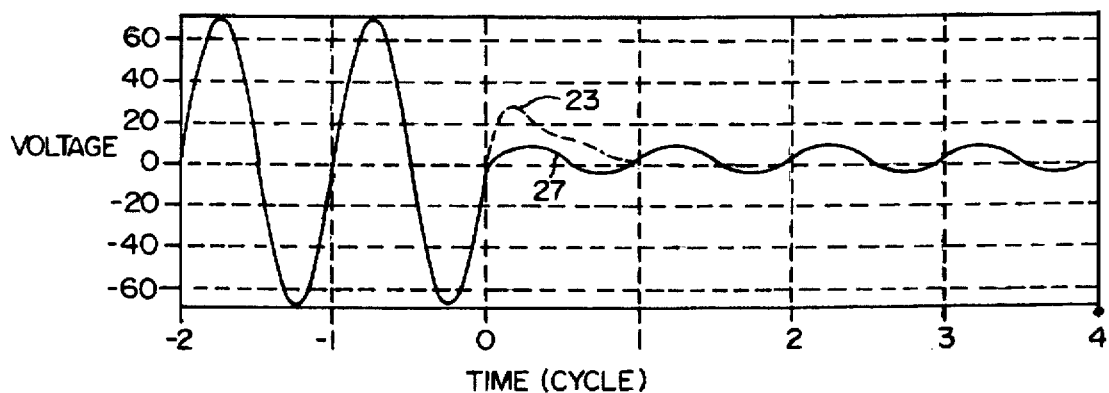
FIG. 2 shows a comparison between the transient response and the ratioed input voltage of a CCVT for a fault at a power system voltage zero crossing.
Figure 3:
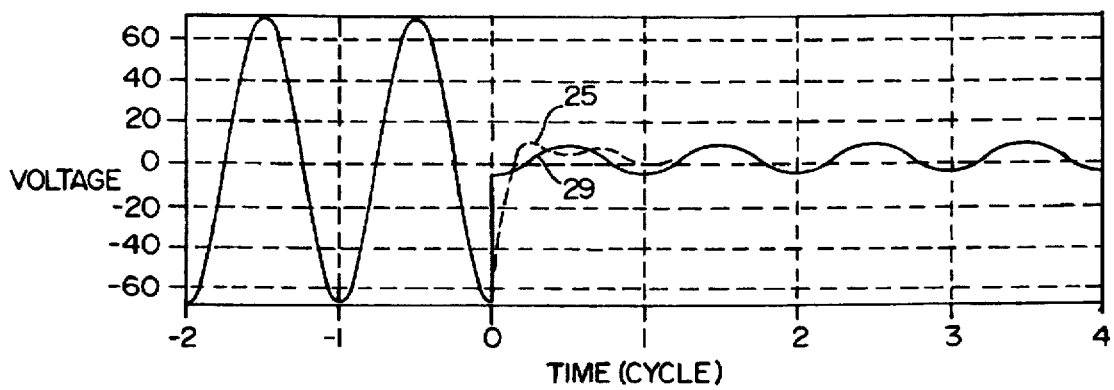
FIG. 3 shows a comparison between the transient response and the ratioed input voltage of a CCVT for a fault at a power system voltage peak point.

The actual shape of the CCVT transient depends to some extent on the precise point of the voltage waveform when the fault occurs. FIGS. 2 and 3 show the output response of a CCVT, including the transient, for a fault which occurs at a voltage zero crossing and at a voltage peak, respectively, of the input signal. Note that the transient 23 for the voltage zero crossing fault is significantly worse than the transient 25 for the fault which occurs at a voltage peak. For a fault which occurs at points on the voltage waveform between the zero crossing and the peak, the transient response will be somewhere between the two responses shown in FIGS. 2 and 3. The true output voltage is shown at 27 and 29 in the respective figures.

The fundamental component of the CCVT transient response determines the overreach of the zone 1 distance element in the relay, i.e. a fault occurring beyond the portion of the line protected by the zone 1 elements where a zone 1 distance element operates undesirably. Obviously, the larger the overreach, the poorer and less secure the performance of the relay. Hence, it is desirable to minimize the magnitude of the transient and make the CCVT output conform as much as possible to the true, non-transient output. However, the protective relay cannot control the transient and must make allowance for the transient and minimize the overreach which might occur due to the transient.

Each of the elements of the CCVT shown in FIG. 1 will have some effect on the transient response of the CCVT. For instance, the total capacitance of capacitors 12 and 14 affects the transient response. Generally, the larger the capacitance the better the transient response, both in terms of decreasing magnitude and duration thereof. A larger capacitance will in addition affect the fundamental component of the transient response. A larger capacitance will also result in a higher value of reactance required for capacitive compensation, such that there is a higher compensating reactor loss. Increased capacitance, however, means a higher total cost for the apparatus.

There is also a difference in the transient, depending on whether the ferroresonance suppression circuit 20 is an active circuit or a passive circuit. FIG. 4a shows an example of an active circuit. The circuit includes a parallel LC circuit comprising a capacitor 22 and an inductor 24. A loading resistor 26 is connected between a midpoint of inductor 24 and one side of the secondary of the transformer portion of the CCVT. The LC circuit is selected so that it will resonate at the frequency of the power system signal and present a high impedance to the power signal voltage at this frequency. Loading resistor 26 will attenuate those voltages having a frequency other than the fundamental power system frequency.

A passive suppression circuit is shown in FIG. 4b, which includes a permanent loading resistor 30 and a parallel, saturable inductor 32 connected from the midpoint of the secondary of the transformer portion to one side thereof. An air gap loading resistor 34 is connected across the secondary. Under normal operating conditions, the secondary voltage is not high enough to flash the air gap or saturate the inductor. The loading resistor 30 thus will have no effect on the performance of the transformer. However, once a ferroresonance oscillation begins, the additional voltage appearing at the secondary will result in a flashing of the gap connected to resistor 34, which results in an attenuation of the oscillation by resistor 34. Inductor 32 saturates at approximately 50% above the nominal secondary voltage value, which helps prevent a sustained ferroresonance oscillation condition.

FIG. 5 shows the CCVT transients for active 35 and passive 37 suppression circuits, respectively, against the true output voltage 39. The passive suppression circuit clearly results in a significantly better CCVT transient response for the same fault. The active storage elements of the active ferroresonance circuit act like a band pass filter and introduce additional time delay in the CCVT secondary and hence aggravate the CCVT transient. The passive resonant circuit typically has little negative impact on the transient response, since most of its elements are isolated from the CCVT output when ferroresonance is not present.

The load or burden connected to the CCVT secondary, such as a protective relay, also has an effect on the CCVT transient characteristic. While the transient response does increase in both magnitude and duration with respect to an increase in the resistive load, such an increase does not result in a corresponding increase in the overreach characteristic of the relay. Hence, a resistive load per se does not appear to be significant relative to the overreach problem generally associated with the transient characteristics of a CCVT.

As indicated above, in the past a number of solutions or compensations have been attempted to accommodate the CCVT transient response and its corresponding effect on zone 1 elements having an overreaching response. In some cases, the solution has been to reduce the zone 1 distance. This has generally proven to be not very effective in those cases where the overreach is large, as this causes the zone 1 distance to decrease to an insignificant distance.

Another solution involves delaying the action of the zone 1 distance elements. If the delay exceeds the duration of the transient response, then the transient response will be basically accommodated, without any direct adverse consequences. However, this solution sacrifices the advantage of the reaction speed of fast solid-state and microprocessor-based relays.

In the present invention, a time delay is used with the presence of a transient response being identified by a number of different comparison functions, using threshold voltages and currents which are automatically calculated, in combination with a supervisory determination which allows a trip signal to proceed within the duration of the time delay if certain selected conditions are met indicating a fault within the zone 1 reach, as opposed to a fault outside the zone 1 reach which appears to be within zone 1 due to the CCVT transient.

Figure 6:
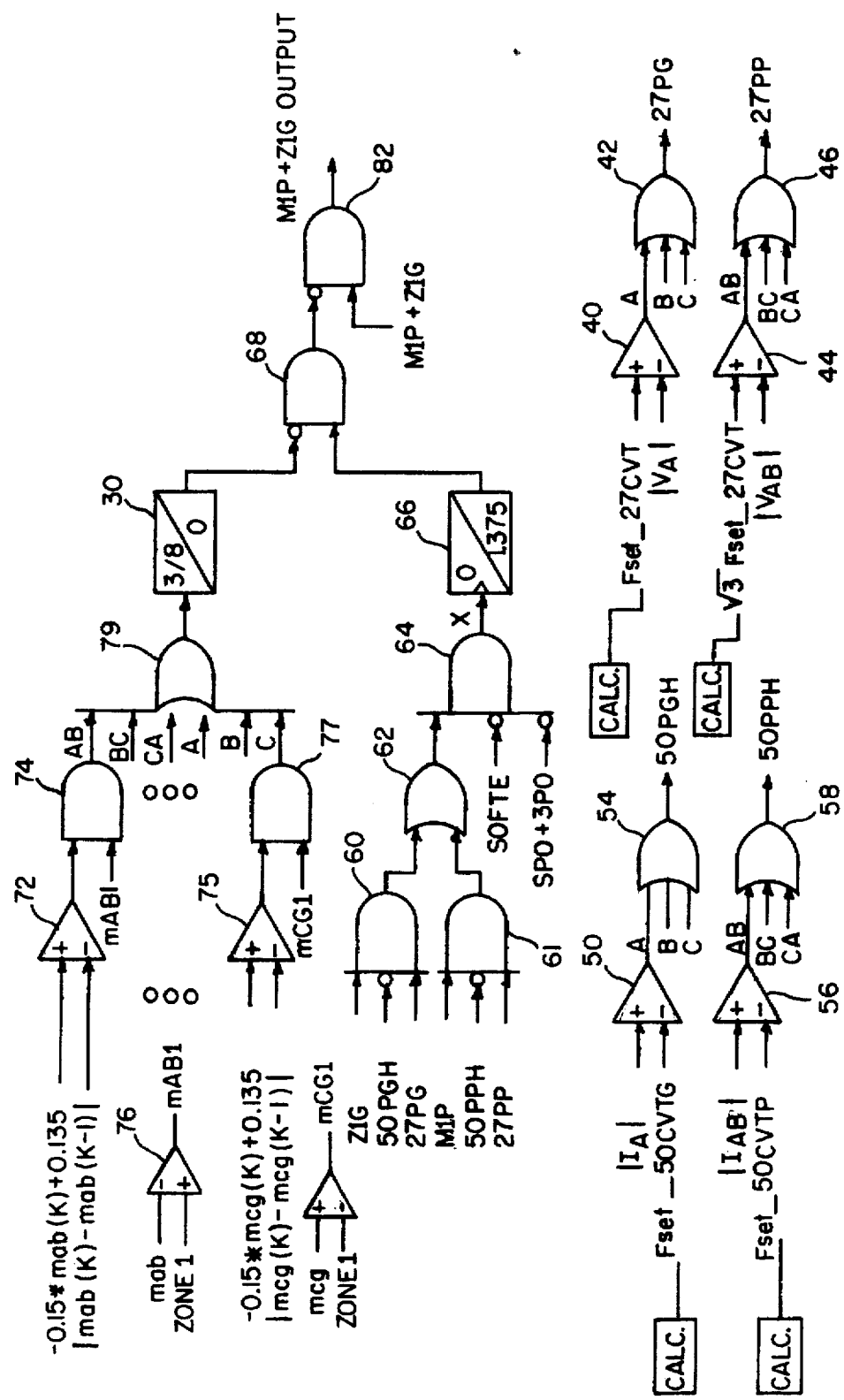
FIG. 6 is a diagram of the transient detection circuit of the present invention.

The circuit for accomplishing these results is shown in FIG. 6. One of the basic purposes of the circuit of FIG. 6 is to recognize CCVT transient conditions and prevent a distance element overreach due to the transient. Only a minimal time delay (significantly less than the transient time delay), however, is permitted for actual zone 1 faults. For ease and reliability of use, the circuit of FIG. 6 is adapted so that the user does not have to make any special settings in the apparatus in order for the circuit to be operative.

The circuit of FIG. 6 is, however, disabled by a lack of a logic enable setting under the following circumstances. First, the circuit is not enabled when the particular relay application does not involve the use of CCVTs, i.e. the circuit of FIG. 6 is used only in those relay applications where there are CCVTs and hence transient responses. Second, the circuit is not enabled when the CCVT uses a passive ferroresonance suppression circuit. As pointed out above, such a passive suppression circuit results in a transient response which does not produce the overreaching characteristics of other CCVT circuits. Third, the circuit is not enabled when the source-to-line impedance ratio (SIR) in a particular application will always be less than five.

The operation of the circuit of FIG. 6 is established on the assumption that the SIR value can be five or greater. It should be understood that another SIR value could be selected. The circuit of FIG. 6 operates over a wide range of SIR values without any significant loss in performance. This feature is important in the automatic calculation of threshold values, without the user having to provide input settings.

In FIG. 6, a low voltage condition of the power system is detected. When the power system voltage is low and all the poles (breakers) are closed, the relay input voltage may include a CCVT transient. A low voltage threshold value is established and each phase-to-ground voltage (A, B and C phase) and phase-to-phase voltage (AB, BC and CA) is compared with the threshold. If any of those voltages is less than the specified threshold, then a conventional phase-to-ground undervoltage element or a phase-to-phase undervoltage element associated with the particular low voltage circuit is asserted, i.e. that particular element produces a high output.

FIG. 6 shows a comparator 40 for phase-to-ground voltage for phase A. Comparator 40 compares the absolute value of the A phase voltage with a low voltage threshold, referred to as an $F_{set}$_27CVT. The numeral "27" is standard industry nomenclature for an undervoltage element. The CVT portion of the designation is arbitrary and may be changed.

The value of the low voltage threshold in the present invention is determined on the basis of a radial transmission line having a source-to-line impedance ratio (SIR) of five. The threshold is in effect the anticipated relay voltage when a short circuit fault occurs at the end of the radial line (a fault which is beyond the zone 1 reach). The threshold voltage value can be calculated by multiplying a threshold value of current, which is discussed below, by the value of the replica line impedances, which are known for a particular transmission line. An alternative way of calculating the voltage threshold for a phase-ground undervoltage element is to ratio the nominal voltage (66.4V) with the source impedance and the line impedance. Where the SIR is five, the resulting threshold is 11.1 volts. The significant aspect of the threshold calculation is that it is accomplished automatically and requires no user-determined settings.

As indicated above, the threshold value is compared with the actual value of the A phase voltage, and if the A phase voltage is less than the threshold, a high output is provided to OR gate 42. Other inputs to OR gate 42 are the outputs of similar comparators using similar threshold voltage values for B phase and C phase voltages. The output of OR gate 42, referred to as 27PG, is applied to a conventional phase-to-ground undervoltage element in the protective relay (not shown) and is an input to AND gate 60. A high output from OR gate 42 will cause the undervoltage element to assert. As indicated above, the numeral "27" is standard industry nomenclature for a relay undervoltage element. "PG" is an arbitrary designation used herein for a phase-to-ground undervoltage element. The assert outputs of the zone 1 distance elements are referred to as an M1P signal (phase distance) and Z1G signal (ground distance), respectively.

The determination of a low voltage condition for a phase-to-phase voltage (AB, BC and CA) is similar. A comparator 44 for the $V_{AB}$ voltage value is shown. Similar comparators are used for $V_{BC}$ and $V_{CA}$ values. The threshold value identified above with respect to the phase-to-ground low voltage comparison in 40 is multiplied by $\sqrt{3}$ and then used as the threshold for comparator 44. The absolute value of the phase A to phase B (AB) voltage is compared against this threshold value. If the $V_{AB}$ value is less than the threshold, then there is a high output to OR gate 46, which also receives inputs from the BC and CA voltage comparators. If any of those three inputs are high, then the output (27PP) of OR gate 46 is also high, which is applied to a low voltage phase-to-phase element and is also used as an input to AND gate 61. The 27PP designation from OR gate 46 identifies a phase-to-phase undervoltage condition.

A low voltage condition alone, however, indicated by either of the undervoltage elements asserting, is not sufficient to reliably indicate a CCVT transient condition and thereby delay zone 1 tripping, because a low voltage condition is also evidence of an actual fault, for example, a close-in fault. In order to reliably indicate a transient condition, a low voltage determination is combined with or supervised by overcurrent elements. FIG. 6 shows the comparison of phase-to-ground current $I_A$ and phase A to phase B current $I_{AB}$ with a threshold. As with the low voltage comparisons, a comparison is also made between the respective threshold and each of the phase-to-ground currents and the phase-to-phase currents in addition to the A phase and AB phase-to-phase currents shown.

In FIG. 6, the phase-to-ground current for A phase ($I_A$) is compared against a threshold designated as $F_{set}$_50CVTG. The numeral "50" is an industry designation referring to an overcurrent condition or element. The other portions of the designation are arbitrary and could be changed. The comparison for $I_A$ is carried out in comparator 50.

The threshold current for comparator 50 is determined according to the following formula:

$$I_A = I_1 + I_2 + I_0 = 3V_{nom}/6(2Z_{L1}+Z_{L0}) = V_{nom}/2 \cdot (2Z_{L1}+Z_{L0})$$

where $I_1$ is positive sequence current, $I_2$ is negative sequence current and $I_0$ is zero sequence current, where $V_{nom}=$ nominal voltage or approximately 66.4$V_{LN}$, where $Z_{L1}$ is the positive sequence replica line impedance and $Z_{LO}$ is the zero sequence replica line impedance. These impedances are user-entered values which are used to characterize the line for use by distance elements and in fault location functions. These impedances are known by the user and are the only values entered. If $I_A$ is larger than the threshold, then the output of comparator 50 is a one or high, which is applied as an input to OR gate 54, along with inputs from the comparators for $I_B$ and $I_C$. If any of the inputs to OR gate 54 are high, the output of OR gate 54 is high, which causes an overcurrent element 50PGH to assert. Again, the designation "50" is an industry nomenclature for an instantaneous overcurrent element, while applicant has used the term "PGH" to refer to a phase-to-ground overcurrent element.

The phase-to-phase comparison, using comparator 56, uses a threshold value 50CVTP calculated as follows for $I_{AB}$:

$$I_{AB}=|A^2-A|\cdot|I_1-I_2|=\sqrt{3}\cdot(2\ I_1)=\sqrt{3}V_{nom}/Z_{L1}\cdot 6$$

If $I_{AB}$ is larger than the threshold, then the output of comparator 56 is high, which is applied to an OR gate 58. The other inputs to OR gate 58 are from similar comparators for $I_{BC}$ and $I_{CA}$ values. The threshold values for those comparators are the same as indicated above for the $I_{AB}$ comparison. The output (50PPH) of OR gate 58 is applied to AND gate 61.

Referring still to FIG. 6, the 50PGH signal and the 27PG signal are applied, as indicated above, to an AND gate 60, with the 50PGH signal being applied to a NOT input of AND gate 60. In addition, the output Z1G from the zone 1 phase-to-ground distance element is also applied to AND gate 60. The output of AND gate 60 is normally low, and goes high only when there is a coincidence of a low voltage indication (the 27PG signal), a NOT high current indication (absence of a 50PGH signal) and an assert from the zone 1 phase-to-ground distance element (the Z1G signal).

As indicated above, the presence of the zone 1 ground distance element assert signal means the relay is about to trip the circuit breaker unless that signal is delayed or extinguished. When the above conditions are satisfied, however, the output of AND gate 60 is high, which is applied to an OR gate 62, the output of which is applied to an AND gate 64, which includes NOT inputs for designated SOFTE and SPO+3PO signals The SOFTE (switch onto fault enable) signal is high for a short time following re-closing of a previously tripped breaker. Otherwise, it is low. Hence, unless there has been a very recent re-closing of a breaker, this input at AND gate 64 will be high. The other input (SPO+3PO) to AND gate 64 is high when there is either a single pole open (SPO) signal, i.e. one phase breaker is open, or all three poles are open (a 3PO signal). If all of the poles are closed, then the corresponding NOT input is also high, and when there is a Z1G signal, a signal is applied to a timer 66. Timer 66 is initiated upon transition of its input signal from 0 to one, and has a zero pickup time. Timer 66 runs for 1.375 cycles, which is typically sufficient to cover the duration of the CCVT transient. The output of timer 66 is applied to an AND gate 68, to which is also applied at a NOT input a signal referred to as an m calculation smoothness signal. The term "m calculation" refers to a fault impedance determination from a formula provided below. The "smoothness" determination refers to the stabilization time required for the calculated fault impedance value to return to a normal value after a fault has occurred. The rate of return or smoothness distinguishes a close-in fault from a CCVT transient. The smoothness determination is carried out by a series of comparators; comparator 72 is exemplary for an m calculation for phase AB.

Comparator 72 compares the quantity 0.15*mab(k)+ 0.135 with the absolute value of mab(k)-mab(k-1), where mab is the m calculation (the minimum reach of a distance element required to just detect the fault presented to the relay) for phase AB, k is the most recent determination of such a value, and k-1 is the value immediately previous to the most recent (k) value. The calculation of an mab is carried out eight times per power signal cycle. Other processing intervals may of course be used within the spirit of the present invention. The m calculation is a fault impedance determination, according to the formula:

$$m = \frac{Re(V\cdot V_p^*)}{Re(ZIV_p^*)}$$

where V equals the measured voltage on the transmission line, $V_P^*$ is the complex conjugate value of the polarizing voltage, Z is the replica line impedance, and I is the measured current of the power system. The polarizing voltage is a reference voltage used within the relay for fault direction and other fault determinations.

The m value expression at the + input to comparator 72 is compared with the difference between the most recently calculated m value and the next most recent m value. If the m value expression at the + input to comparator 72 exceeds the m value at the – input, an output from comparator 72 is applied to AND gate 74. The other input to AND gate 74 is what is referred to in FIG. 6 as an mAB1 signal. mAB1 is the result of a comparison by comparator 76 between the mab value and a threshold value for a zone 1 AB phase distance element. If the mab value is less than the threshold, then the output of comparator 76 is high and this is applied to AND gate 74. An mab value less than the zone 1 threshold means that the relay detects a fault within the reach of the zone 1 phase distance element.

The output of AND gate 74 is applied as one input to an OR gate 78. The other inputs to OR gate 78 are results of similar comparisons for m calculation smoothness for a fault impedance of phase B to phase C, and phase C to phase A. A similar comparator 75 and AND gate 77 combination is shown for a phase C to ground determination with the mCG1 signal resulting from a comparison of the mcg impedance values against a selected threshold. Similar comparator and AND gate combinations are used for phase A to ground and phase B to ground. These outputs are also applied as inputs to OR gate 78.

The output of OR gate 78 is applied to a timer 80. If any of the above-described m calculation comparisons result in a high output from, for instance, AND gate 74 or other comparable AND gate, it indicates that the fault impedance value has stabilized or normalized at a rate which is indicative of a close-in fault as opposed to a CCVT transient. When the output of OR gate 78 goes high, the output of timer 80 will be delayed for ⅜ths of a cycle from going high; it will stay high as long as the output of OR gate 78 thereafter remains high.

A high output of timer 80 is applied to AND gate 68 to disable or override the blocking signal output from timer 66. If the m calculation smoothness factor does not indicate a prompt return to normalcy, then the output from timer 80 will continue low and the output from AND gate 68 will be high. This output is applied to a NOT input of AND gate 82. The other input to AND gate 82 is a zone 1 phase or ground assertion from a zone 1 distance element. If there is a zone 1 distance element assertion, which would otherwise result in a trip signal, and the conditions have been satisfied indicating a CCVT transient, such that timer 66 is running for 1.375 cycles and if the m calculation smoothness is not sufficient to override the timer 66 output by the timer 80 output, then the output of AND gate 82 remains low and there is no trip signal, resulting in a delay in the zone 1 trip signal for the 1.375 cycles of timer 66.

However, if there is an output from timer 80, indicating that the override or supervisory function of the circuits leading into timer 80 have been satisfied, then after ⅜ths of a cycle, and a continuing signal from zone 1 distance elements, then there will be a high output from AND gate 82, resulting in an override of the 1.375 cycle delay to allow a faster tripping signal (prior to the full 1.375 cycles). Hence, there is protection in the event of an actual fault against the delay in tripping produced by the CCVT transient detection circuit.

Hence, the present invention provides a controlled trip signal which takes into account the CCVT transient, but also provides fast tripping in the event of a recognized true fault, which is accomplished by m calculations. In addition, the circuit is quite user-friendly, since it requires basically no settings by the user when they are using CCVTs in applications where the SIR value can exceed five. Only the line impedance values need to be set, and these settings are required in any event for distance protection. The thresholds for all determinations are then automatically calculated.

Although a preferred embodiment of the invention has been disclosed herein for illustration, it should be understood that various changes, modifications and substitutions may be incorporated in such embodiment without departing from the spirit of the invention, which is defined by the claims as follows.

What is claimed is:

1. A system for detecting and compensating for a transient signal from a coupling capacitor voltage transformer used in a protective relay for a power system, comprising:

means for detecting a low voltage condition on the power transmission line which would otherwise result in a trip signal to a circuit breaker for the system;

means for detecting a high current condition on the power transmission line;

means for time delaying the trip signal if a high current condition is not present when the low voltage condition is detected; and means for by-passing a remaining portion of the time delay, such that a trip signal is sent to the circuit breaker prior to expiration of the time delay, if a fault impedance determination achieves a selected characteristic prior to completion of time delay.

2. An apparatus of claim 1, wherein the selected characteristic is the smoothness of at least one impedance calculation.

3. An apparatus of claim 1, wherein the time delay is 1.375 cycles.

4. An apparatus of claim 2, wherein the fault impedance smoothness calculations have variable thresholds.

5. An apparatus of claim 1, including means for establishing low voltage and high current thresholds automatically, without the requirement of user settings.

6. An apparatus of claim 1, wherein the impedance value is determined according to the following formula:

$$\frac{Re(V \cdot V_p^*)}{Re[Z \cdot I \cdot V_p^*]}$$

7. An apparatus of claim 5, wherein the low voltage and high current detection means including thresholds established using the line impedance, a predetermined SIR and a predetermined value of secondary voltage.

8. An apparatus of claim 7, wherein the SIR is equal to five and the secondary voltage is equal to the nominal secondary voltage.

9. An apparatus of claim 8, wherein the nominal secondary voltage is 66.4 volts.

10. An apparatus of claim 1, wherein the high current detecting means includes a phase-to-ground high current determination threshold and a phase-to-phase high current determination threshold and the low voltage detecting means includes a low voltage determination threshold and wherein the threshold for a phase-to-ground high current determination is $V/2(2Z_{L1}+Z_{L0})$, where V is a nominal voltage level, and wherein the threshold for a phase-to-phase high current determination is $\sqrt{3}V/6Z_{L1}$, where V is the nominal voltage.

11. An apparatus of claim 10, wherein the threshold for the low voltage determinations is the value of the current thresholds multiplied by the value of the combined replica line impedances.

12. An apparatus of claim 1, wherein the power system has a power system signal thereon and wherein the remaining portion of the time delay is by-passed after ⅜ths of a cycle of the power system signal has occurred.

* * * * *